(12) United States Patent
Gaur et al.

(10) Patent No.: US 11,562,745 B2
(45) Date of Patent: Jan. 24, 2023

(54) SEQUENCE-TO-SEQUENCE SPEECH RECOGNITION WITH LATENCY THRESHOLD

(71) Applicant: Microsoft Technology Licensing, LLC, Redmond, WA (US)

(72) Inventors: Yashesh Gaur, Bellevue, WA (US); Jinyu Li, Redmond, WA (US); Liang Lu, Redmond, WA (US); Hirofumi Inaguma, Kyoto (JP); Yifan Gong, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 121 days.

(21) Appl. No.: 16/841,542

(22) Filed: Apr. 6, 2020

(65) Prior Publication Data

US 2021/0312923 A1 Oct. 7, 2021

(51) Int. Cl.
*G10L 15/26* (2006.01)
*G10L 15/16* (2006.01)

(52) U.S. Cl.
CPC .............. *G10L 15/26* (2013.01); *G10L 15/16* (2013.01)

(58) Field of Classification Search
CPC ......... G10L 15/00; G10L 15/16; G10L 15/26; G06F 3/00; G06F 3/167
See application file for complete search history.

(56) References Cited

U.S. PATENT DOCUMENTS

| | | | |
|---|---|---|---|
| 2017/0103752 A1* | 4/2017 | Senior .................. | G06N 3/0445 |
| 2019/0130903 A1* | 5/2019 | Sriram .................. | G10L 15/063 |
| 2019/0147339 A1* | 5/2019 | Nachum .............. | G06N 3/0472 |
| | | | 706/25 |
| 2019/0189115 A1* | 6/2019 | Hori ........................ | G10L 15/16 |

(Continued)

OTHER PUBLICATIONS

Chiu CO, Raffel C. "Monotonic chunkwise attention." arXiv preprint arXiv: 1712.05382. https://arxiv.org/pdf/1712.05382v1.pdf [Published online: Dec. 14, 2017] [Electronically retrieved: Oct. 28, 2021] (Year: 2017).*

(Continued)

*Primary Examiner* — Lamont M Spooner
*Assistant Examiner* — Sean E Serraguard
(74) *Attorney, Agent, or Firm* — Alleman Hall Creasman & Tuttle LLP

(57) ABSTRACT

A computing system including one or more processors configured to receive an audio input. The one or more processors may generate a text transcription of the audio input at a sequence-to-sequence speech recognition model, which may assign a respective plurality of external-model text tokens to a plurality of frames included in the audio input. Each external-model text token may have an external-model alignment within the audio input. Based on the audio input, the one or more processors may generate a plurality of hidden states. Based on the plurality of hidden states, the one or more processors may generate a plurality of output text tokens. Each output text token may have a corresponding output alignment within the audio input. For each output text token, a latency between the output alignment and the (Continued)

external-model alignment may be below a predetermined latency threshold. The one or more processors may output the text transcription.

20 Claims, 12 Drawing Sheets

(56) References Cited

U.S. PATENT DOCUMENTS

2020/0312306 A1* 10/2020 Moritz ................ G10L 15/16
2021/0183373 A1* 6/2021 Moritz ................ G10L 15/22

OTHER PUBLICATIONS

Hori, T., Watanabe, S., Zhang, Y., & Chan, W. "Advances in Joint CTC-Attention Based End-to-End Speech Recognition with a Deep CNN Encoder and RNN-LM." INTERSPEECH, Published: Jun. 7, 2017 (Year: 2017).*

Arivazhagan, et al., "Monotonic Infinite Lookback Attention for Simultaneous Machine Translation", In Proceedings of the 57th Annual Meeting of the Association for Computational Linguistics (ACL), Jul. 28, 2019, pp. 1313-1323.

Audhkhasi, et al., "Direct Acoustics-to-Word Models for English Conversational Speech Recognition", In Proceedings of the 18th Annual Conference of the International Speech Communication Association, Aug. 20, 2017, 5 Pages.

Ba, et al., "Layer Normalization", In repository of arXiv, arXiv:1607. 06450, Jul. 21, 2016, 14 Pages.

Battenberg, et al., "Exploring Neural Transducers for End-to-End Speech Recognition", In Proceedings of IEEE Automatic Speech Recognition and Understanding Workshop, Dec. 16, 2017, pp. 206-213.

Chan, et al., "Listen, Attend and Spell: A Neural Network for Large Vocabulary Conversational Speech Recognition", In Proceedings of IEEE International Conference on Acoustics, Speech and Signal Processing, Mar. 20, 2016, pp. 4960-4964.

Chan, et al., "On Online Attention-based Speech Recognition and Joint Mandarin Character-Pinyin Training", In Proceedings of the 17th Annual Conference of the International Speech Communication Association, Sep. 8, 2016, pp. 3404-3408.

Chiu, et al., "Monotonic Chunkwise Attention", In Proceedings of the Sixth International Conference on Learning Representations, Apr. 30, 2018, 16 Pages.

Chiu, et al., "State-of-the-Art Speech Recognition with Sequence-to-Sequence Models", In Proceeding of IEEE International Conference on Acoustics, Speech and Signal Processing, Apr. 15, 2018, pp. 4774-4778.

Chorowski, et al., "Attention-Based Models for Speech Recognition", In Advances in Neural Information Processing Systems, Dec. 7, 2015, 9 Pages.

Chung, et al., "Empirical Evaluation of Gated Recurrent Neural Networks on Sequence Modeling", In repository of arXiv, arXiv:1412. 3555, Dec. 11, 2014, 9 Pages.

Dong, et al., "CIF: Continuous Integrate-and-Fire for End-to-End Speech Recognition", In repository of arXiv, arXiv:1905.11235, May 27, 2019, 11 Pages.

Fan, et al., "An Online Attention-based Model for Speech Recognition", In Proceedings of the 20th Annual Conference of the International Speech Communication Association, Sep. 15, 2019, pp. 4390-4394.

Garg, et al., "Improved Multi-Stage Training of Online Attention-based Encoder-Decoder Models", In Proceedings of IEEE Automatic Speech Recognition and Understanding Workshop (ASRU), Dec. 14, 2019, pp. 70-77.

Graves, et al., "Connectionist Temporal Classification: Labelling Unsegmented Sequence Data with Recurrent Neural Networks", In Proceedings of the 23rd International Conference on Machine Learning, Jun. 25, 2006, pp. 369-376.

Graves, Alex, "Sequence Transduction with Recurrent Neural Networks", In repository of arXiv, arXiv:1211.3711, Nov. 14, 2012, 9 Pages.

Graves, et al., "Towards End-to-End Speech Recognition with Recurrent Neural Networks", In Proceedings of the International Conference on Machine Learning, Jan. 27, 2014, 9 Pages.

Hou, et al., "Gaussian Prediction based Attention for Online End-to-End Speech Recognition", In Proceedings of 18th Annual Conference of the International Speech Communication Association, Aug. 20, 2017, pp. 3692-3696.

Hou, et al., "Segment Boundary Detection Directed Attention for Online End-to-End Speech Recognition", Published in EURASIP Journal on Audio, Speech, and Music Processing, Jan. 30, 2020, pp. 1-16.

Jaitly, et al., "A Neural Transducer", In repository of arXiv, arXiv:1511. 04868, Aug. 4, 2016, 10 Pages.

Kannan, et al., "An Analysis of Incorporating an External Language Model into a Sequence-to-Sequence Model", In Proceedings of IEEE International Conference on Acoustics, Speech and Signal Processing (ICASSP), Apr. 15, 2018, pp. 5824-5828.

Kim, et al., "Attention Based On-Device Streaming Speech Recognition with Large Speech Corpus", In Proceedings of IEEE Automatic Speech Recognition and Understanding Workshop (ASRU), Dec. 14, 2019, pp. 956-963.

Kingma, et al., "Adam: A Method for Stochastic Optimization", In repository of arXiv, arXiv:1412.6980, Dec. 22, 2014, 9 Pages.

Li, et al., "Advancing Acoustic-to-Word CTC Model", In Proceedings of IEEE International Conference on Acoustics, Speech and Signal Processing (ICASSP), Apr. 15, 2018, pp. 5794-5798.

Li, et al., "End-to-end Speech Recognition with Adaptive Computation Steps", In Proceedings of IEEE International Conference on Acoustics, Speech and Signal Processing (ICASSP), May 12, 2019, pp. 6246-6250.

Liu, et al., "Sequence-to-sequence Automatic Speech Recognition with Word Embedding Regularization and Fused Decoding", In repository of arXiv, arXiv:1910.12740, Feb. 5, 2020, 5 Pages.

Luong, et al., "Effective Approaches to Attention-based Neural Machine Translation", In Proceedings of the Conference on Empirical Methods in Natural Language Processing, Sep. 17, 2015, pp. 1412-1421.

Merboldt, et al., "An Analysis of Local Monotonic Attention Variants", In Proceedings of the 20th Annual Conference of the International Speech Communication Association, Sep. 15, 2019, pp. 1398-1402.

Miao, et al., "Online Hybrid CTC/Attention Architecture for End-to-end Speech Recognition", In Proceedings of the 20th Annual Conference of the International Speech Communication Association, Sep. 15, 2019, pp. 2623-2627.

Mortiz, et al., "Triggered Attention for End-to-end Speech Recognition", In Proceeding of IEEE International Conference on Acoustics, Speech and Signal Processing (ICASSP), May 12, 2019, pp. 5666-5670.

Prabhavalkar, et al., "A Comparison of Sequence-to-Sequence Models for Speech Recognition", In Proceedings of the 18th Annual Conference of the International Speech Communication Association, Aug. 20, 2017, pp. 939-943.

Raffel, et al., "Online and Linear-Time Attention by Enforcing Monotonic Alignments", In Proceedings of the 34th International Conference on Machine Learning, vol. 70, Aug. 6, 2017, 19 Pages.

Sak, et al., "Acoustic modelling with CD-CTC-SMBR LSTM RNNS", In Proceedings of IEEE Workshop on Automatic Speech Recognition and Understanding (ASRU), Dec. 13, 2015, pp. 604-609.

Sak, et al., "Learning Acoustic Frame Labeling for Speech Recognition with Recurrent Neural Networks", In Proceedings of IEEE International Conference on Acoustics, Speech and Signal Processing (ICASSP), Apr. 19, 2015, pp. 4280-4284.

Szegedy, et al., "Rethinking the Inception Architecture for Computer Vision", In Proceedings of IEEE Conference on Computer Vision and Pattern Recognition, Jun. 26, 2016, pp. 2818-2826.

Tjandra, et al., "Local Monotonic Attention Mechanism for End-to-End Speech And Language Processing", In Proceedings of the

(56) References Cited

OTHER PUBLICATIONS

Eighth International Joint Conference on Natural Language Processing, vol. 1, Nov. 27, 2017, pp. 431-440.

Toshniwal, et al., "A Comparison of Techniques for Language Model Integration in Encoder-Decoder Speech Recognition", In Proceedings of IEEE Spoken Language Technology Workshop (SLT), Dec. 18, 2018, pp. 369-375.

Toshniwal, et al., "Multitask Learning with Low-Level Auxiliary Tasks for Encoder-Decoder Based Speech Recognition", In Proceedings of the 18th Annual Conference of the International Speech Communication Association, Aug. 20, 2017, 5 Pages.

Watanabe, et al., "Hybrid CTC/Attention Architecture for End-to-End Speech Recognition", Published in IEEE Journal of Selected Topics in Signal Processing vol. 11, Issue 8, Dec. 2017, pp. 1240-1253.

Weng, et al., "Improving Attention Based Sequence-to-Sequence Models for End-to-End English Conversational Speech Recognition", In Proceedings of the 19th Annual Conference of the International Speech Communication Association, Sep. 2, 2018, pp. 761-765.

Yu, et al., "A Multistage Training Framework For Acoustic-to-Word Model", In Proceedings of the 19th Annual Conference of the International Speech Communication Association, Sep. 2, 2018, pp. 786-790.

Zhang, et al., "Acoustic Modeling with DFSMN-CTC and Joint CTC-CE Learning", In Proceedings of the 19th Annual Conference of the International Speech Communication Association, Sep. 2, 2018, pp. 771-775.

Inaguma, et al., "Minimum Latency Training Strategies for Streaming Sequence-to-Sequence ASR", In The Repository of arXiv:2004.05009v1, Apr. 10, 2020, 5 Pages.

"International Search Report and Written Opinion Issued in PCT Application No. PCT/US21/018079", dated May 14, 2021, 12 Pages. ( Zhang, et al., "An Exploration of Directly Using Word as Acoustic Modeling Unit for Speech Recognition", In Proceedings of IEEE Spoken Language Technology Workshop, Dec. 18, 2018, pp. 64-69.

\* cited by examiner

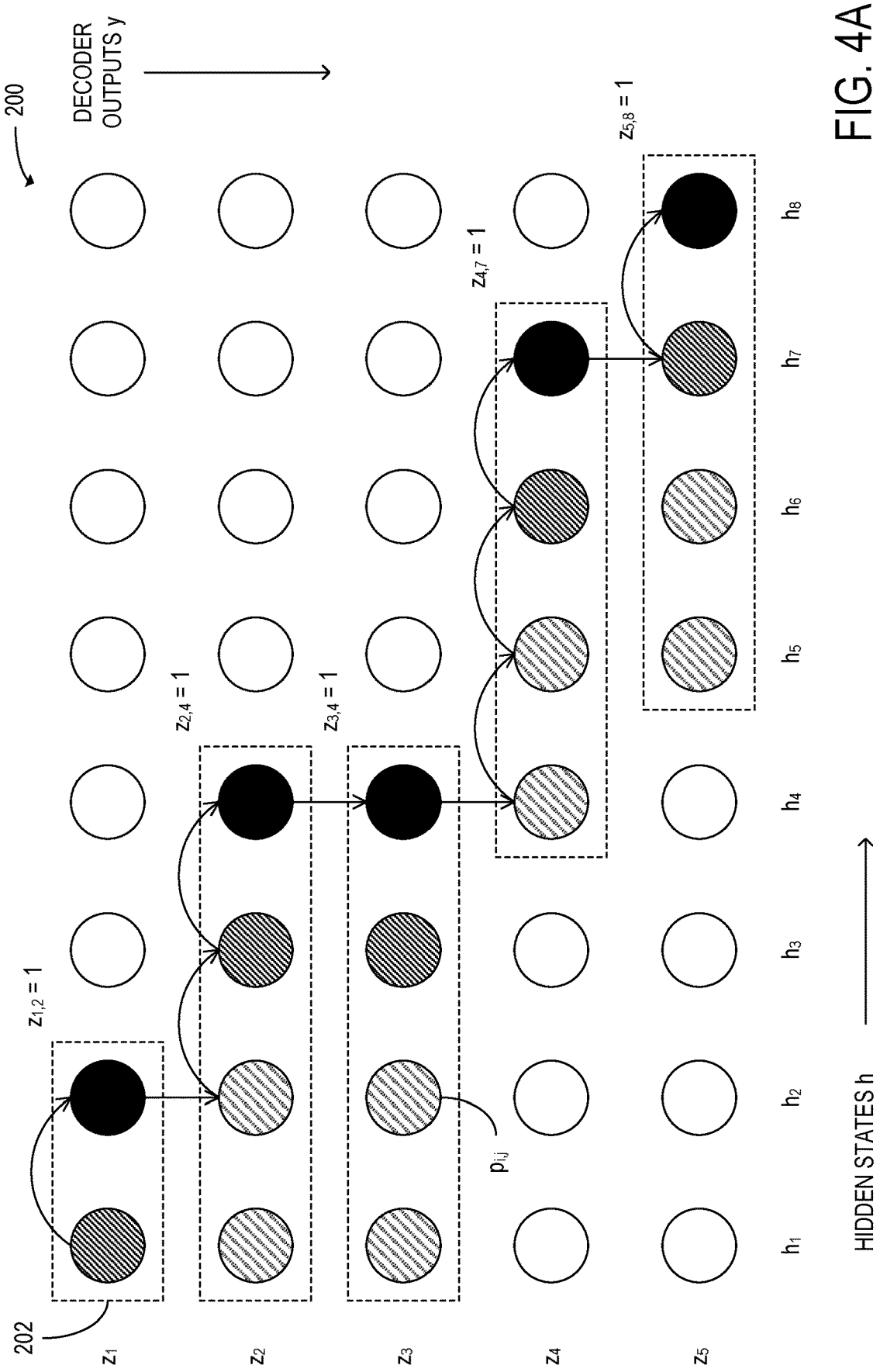

SEQUENCE-TO-SEQUENCE SPEECH RECOGNITION WITH LATENCY THRESHOLD

BACKGROUND

In automatic speech recognition (ASR), a text transcription of a spoken input is generated at a computing device. This text transcription is frequently generated in real time as a user is speaking. When ASR is performed in real time, there is a delay between the time at which the user speaks the input and the time at which the computing device outputs the transcription. Long delays between the input and output may make an ASR application program slow and cumbersome to use.

In addition, previous attempts to reduce the latency of ASR have frequently led to increases in the word error rate (WER), the rate at which the ASR application program incorrectly identifies words included in the input. Thus, existing ASR methods have had a tradeoff between low latency and low WER.

SUMMARY

According to one aspect of the present disclosure, a computing system is provided, including one or more processors configured to receive an audio input. The one or more processors may be further configured to generate a text transcription of the audio input at a sequence-to-sequence speech recognition model. The sequence-to-sequence speech recognition model may be configured to assign a respective plurality of external-model text tokens to a plurality of frames included in the audio input. Each external-model text token may have an external-model alignment within the audio input. Based on the audio input, the sequence-to-sequence speech recognition model may be further configured to generate a plurality of hidden states. Based on the plurality of hidden states, the sequence-to-sequence speech recognition model may be further configured to generate a plurality of output text tokens corresponding to the plurality of frames. Each output text token may have a corresponding output alignment within the audio input. For each output text token, a latency between the output alignment and the external-model alignment may be below a predetermined latency threshold. The one or more processors may be further configured to output the text transcription including the plurality of output text tokens to an application program, user interface, or file storage location.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 4A shows the respective selection probabilities for a plurality of hidden states when the decoder model is a monotonic chunkwise attention model, according to the embodiment of FIG. 1.

DETAILED DESCRIPTION

End-to-end ASR models are a class of ASR models in which the input and output are each represented as an ordered sequence of values. For example, the input and output of an end-to-end ASR model may each be represented as a vector. The respective elements of the input sequence and the output sequence may each encode frames that correspond to time intervals in the input sequence and output sequence respectively. An end-to-end ASR model may be a frame-synchronous model in which the length of the input sequence equals the length of the output sequence. Examples of frame-synchronous models include connectionist temporal classification (CTC), recurrent-neural-network-transducer (RNN-T), and recurrent neural aligner (RNA) models. Alternatively, the end-to-end ASR model may be a label-synchronous model in which the input sequence and output sequence have different respective lengths. Examples of label-synchronous models include attention-based sequence-to-sequence (S2S) and transformer models.

Some previously developed attention-based S2S models have lower WERs than frame-synchronous models. However, previous attempts to apply attention-based S2S models in real-time streaming scenarios have encountered difficulties due to the attention-based S2S models having high latencies.

Figure 1:
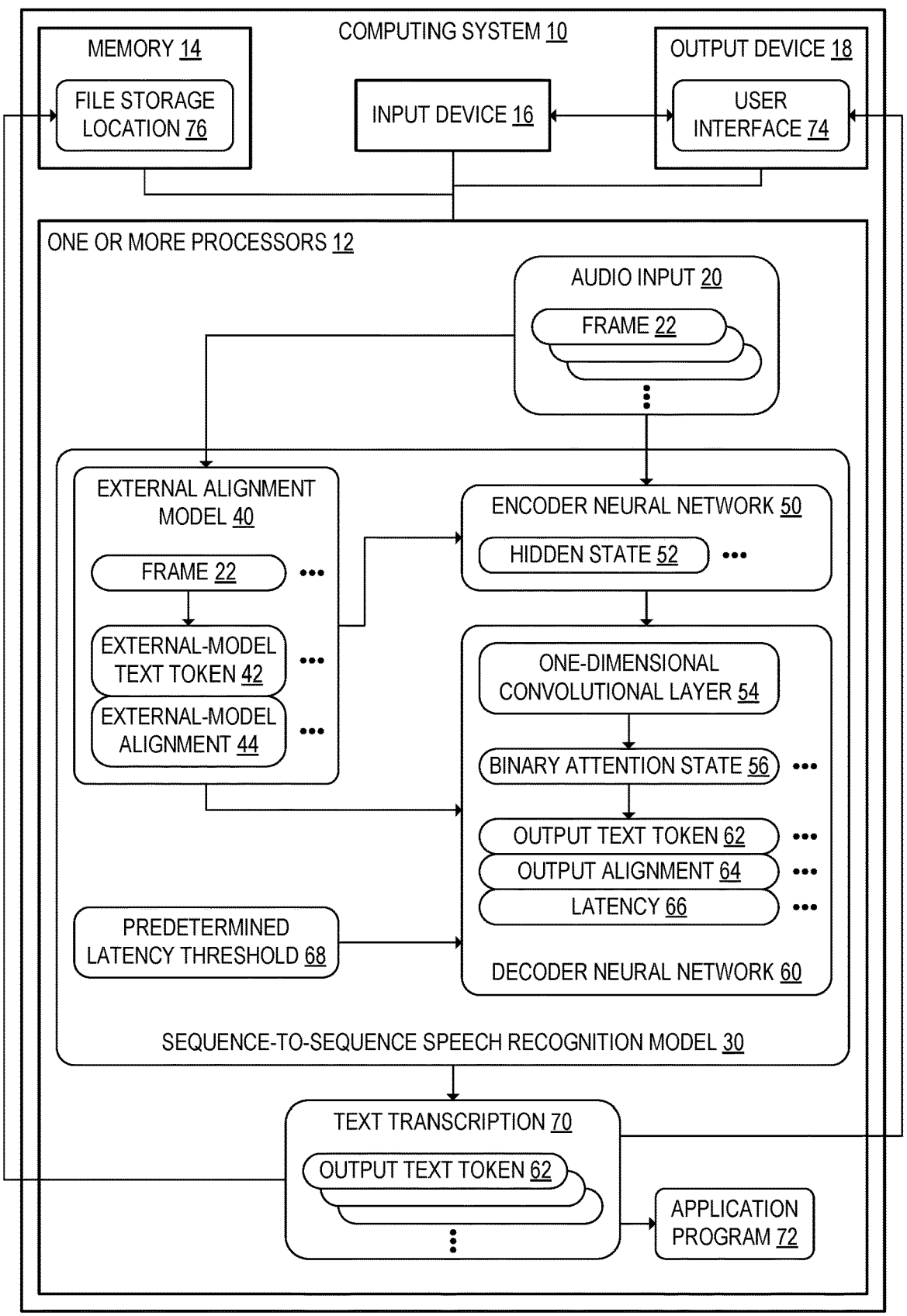
FIG. 1 schematically shows an example computing system including one or more processors configured to execute a sequence-to-sequence speech recognition model, according to one embodiment of the present disclosure.

In order to address the shortcomings of existing ASR models, a computing system 10 is provided, as schematically shown in FIG. 1 according to one example embodiment. The computing system 10 may include one or more processors 12. In some embodiments, the one or more processors 12 may each include a plurality of processor cores on which one or more processor threads may be executed. The computing system 10 may further include memory 14 that may be operatively coupled to the one or more processors 12 such that the one or more processors 12 may store data in the memory 14 and retrieve data from the memory 14. The memory 14 may include Random Access Memory (RAM) and may further include non-volatile storage. The non-volatile storage may store instructions configured to be executed by the one or more processors 12.

The computing system 10 may further include one or more input devices 16, which may be operatively coupled to the one or more processors 12. For example, the one or more input devices 16 may include one or more microphones, one or more cameras (e.g. RGB cameras, depth cameras, or stereoscopic cameras), one or more accelerometers, one or more orientation sensors (e.g. gyroscopes or magentometers), one or more buttons, one or more touch sensors, or other types of input devices 16. The computing system 10 may further include one or more output devices 18, which may also be operatively coupled to the one or more processors 12. The one or more output device 18 may, for example, include one or more displays, one or more speakers, one or more haptic feedback units, or other types of output devices 18. The one or more processors 12 of the computing system 10 may be configured to transmit instructions to output a user interface 74, such as a graphical user interface, on the one or more output devices 18. In addition, the one or more processors 12 may be further configured to receive user input interacting with the user interface 74 via the one or more input devices 16.

In some embodiments, the functions of the one or more processors 12 and the memory 14 may be instantiated across a plurality of operatively coupled computing devices. For example, the computing system 10 may include one or more client computing devices communicatively coupled to one or more server computing devices. Each of the operatively coupled computing devices may perform some or all of the functions of the one or more processors 12 or memory 14 discussed below. For example, a client computing device may receive one or more inputs at the one or more input devices 16 and may offload one or more steps of processing those inputs to one or more server computing devices. The server computing devices may, in this example, return one or more outputs to the client computing device to output on the one or more output devices 18. In such embodiments, the one or more processors 12 may be distributed between the client computing device and the one or more server computing devices.

The one or more processors 12 may be configured to receive an audio input 20. In embodiments in which a processor 12 and one or more microphones are included in the same physical computing device, the processor 12 may receive the audio input 20 from the one or more microphones via an application program interface (API). In other embodiments, at least one processor 12 of the one or more processors 12 may receive an audio input 20 conveyed to the processor 12 from another physical computing device (e.g. a thin client computing device). In some embodiments, the one or more processors 12 may be further configured to pre-process the audio input 20 by dividing the audio input 20 into an ordered sequence of frames 22 corresponding to time intervals within the audio input 20.

The one or more processors 12 may be further configured to generate a text transcription 70 of the audio input 20 at a sequence-to-sequence speech recognition model 30, as described in further detail below. The text transcription 70 may include a plurality of output text tokens 62, which may indicate words, portions of words, punctuation marks, speaker identifiers, utterance delimiters, and/or other text indicating one or more features of the audio input 20. In some embodiments, the audio input 20 may be a streaming audio input received by the one or more processors 12 over an input time interval. In such embodiments, the one or more processors 12 may be further configured to output the text transcription 70 during the input time interval concurrently with receiving the audio input 20. Thus, the one or more processors 12 may be configured to transcribe the audio input 20 in real time as the audio input 20 is received. After the text transcription 70 has been generated, the one or more processors 12 may be further configured to output the text transcription 70 including the plurality of output text tokens 62 to an application program 72, a user interface 74, or a file storage location 76.

The S2S speech recognition model 30 may include an external alignment model 40, an encoder neural network 50, and a decoder neural network 60. Each of these sub-models of the S2S speech recognition model 30 is described in further detail below.

At the external alignment model 40, the one or more processors 12 may be further configured to assign a respective plurality of external-model text tokens 42 to a plurality of frames 22 included in the audio input 20. The frames 22 to which the external-model text tokens 42 are assigned may be the frames 22 into which the audio input 20 was segmented during pre-processing. The external alignment model 40 may be an acoustic feature detection model that is configured to assign the external-model text tokens 42 to indicate senone-level features in the audio input 20. For example, boundaries between words included in the audio input 20 may be estimated at the external alignment model 40. The external alignment model 40 may be a recurrent neural network (RNN). In some embodiments, the external alignment model 40 may be a CTC model.

Each external-model text token 42 identified at the external alignment model 40 may have an external-model alignment 44 within the audio input 20. The external-model alignment 44 of an external-model text token 42 may be an indication of a frame 22 with which the external-model text token 42 is associated. Thus, the external-model alignment 44 may be an estimate of a ground-truth alignment of acoustic features in a user's utterance.

At the encoder neural network 50, based on the audio input 20, the one or more processors 12 may be further configured to generate a plurality of hidden states 52. The hidden states 52 may be word-level or sub-word-level latent representations of features included in the audio input 20. In some embodiments, the plurality of hidden states 52 may be represented as a vector of encoder outputs $h_j$. The encoder neural network 50 may be an RNN, such as a long short-term memory (LSTM) network, a gated recurrent unit (GRU), or some other type of RNN.

At the decoder neural network 60, the one or more processors 12 may be further configured to generate a plurality of output text tokens 62 based on the plurality of hidden states 52, as discussed in further detail below. The plurality of output text tokens 62 may be represented as a vector $Y=(y_1, \ldots, y_L)$, where L is the total number of output text tokens 62. The plurality of output text tokens 62 may be included in the text transcription 70 that is output by the S2S speech recognition model 30. Each output text token 62 generated at the decoder neural network 60 may be associated with a frame 22 of the audio input 20 and may have a corresponding output alignment 64 within the audio input 20 that indicates the frame 22 with which the output text token 62 is associated.

For each output text token 62, a latency 66 between the output alignment 64 and the external-model alignment 44 may be below a predetermined latency threshold 68. Example values of the predetermined latency threshold 68 are 4 frames, 8 frames, 12 frames, 16 frames, 24 frames, and 32 frames. Alternatively the predetermined latency threshold 68 may be some other number of frames.

Figure 2:
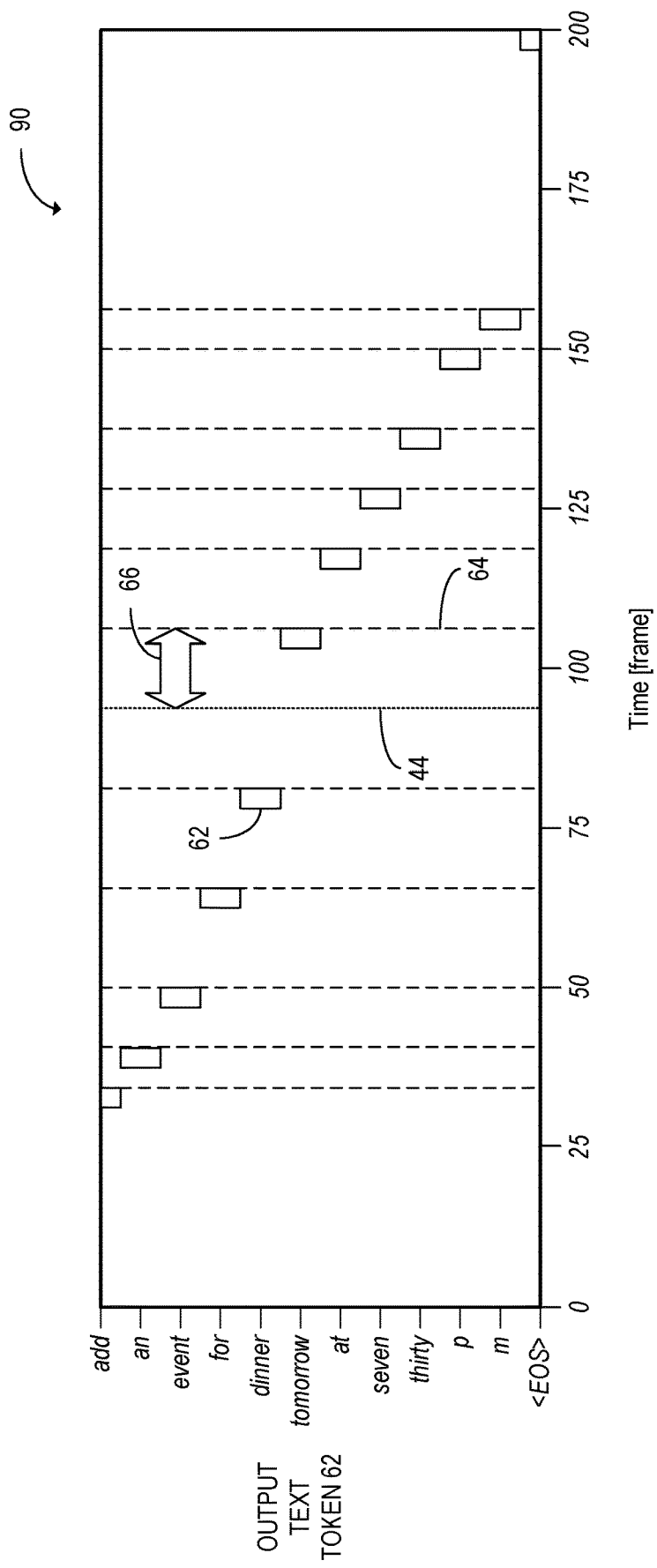
FIG. 2 shows an example timeline of the generation of a text transcription for an audio input, according to the embodiment of FIG. 1.

FIG. 2 shows an example timeline 90 of the generation of a text transcription 70 for the audio input 20 "add an event for dinner tomorrow at seven thirty p.m." In the example of FIG. 2, a respective output text token 62 is generated for each word of the audio input 20, as well as for the delimiter <EOS> that marks the end of the utterance. The timeline 90 of FIG. 2 further shows the output alignment 64 for each output text token 62. For one of the output text tokens 62, the timeline 90 also shows the external-model alignment 44 for that output text token 62 and the latency 66 between the output alignment 64 and the external-model alignment 44.

To evaluate the latency 66 between the output alignment 64 and the external-model alignment 44 for a plurality of audio inputs 20, the one or more processors 12 may be configured to compute a corpus-level latency $\Delta_{corpus}$ or an utterance-level latency $\Delta_{utterance}$. The corpus-level latency $\Delta_{corpus}$ may be computed as the difference (e.g. in number of frames 22) between respective boundaries $\hat{b}_i^k$ of each of a plurality of output text tokens 62 and the corresponding boundaries $b_i^k$ of the external-model text tokens 42 computed at the external alignment model 40. An example equation for the corpus-level latency $\Delta_{corpus}$ is provided below:

$$\Delta_{corpus} = \frac{1}{\sum_{k=1}^{N}|y^k|}\sum_{k=1}^{N}\sum_{i=1}^{|y^k|}\left(\hat{b}_i^k - b_i^k\right)$$

In this equation, N is the number of audio inputs 20 and $y^k$ is the kth output text token 62. The utterance-level latency $\Delta_{utterance}$ may be computed as an average of the mean latency for each audio input 20. An example equation for the utterance-level latency $\Delta_{utterance}$ is as follows:

$$\Delta_{utterance} = \frac{1}{N}\sum_{k=1}^{N}\frac{1}{|y^k|}\sum_{i=1}^{|y^k|}\left(\hat{b}_i^k - b_i^k\right)$$

Figure 3A:
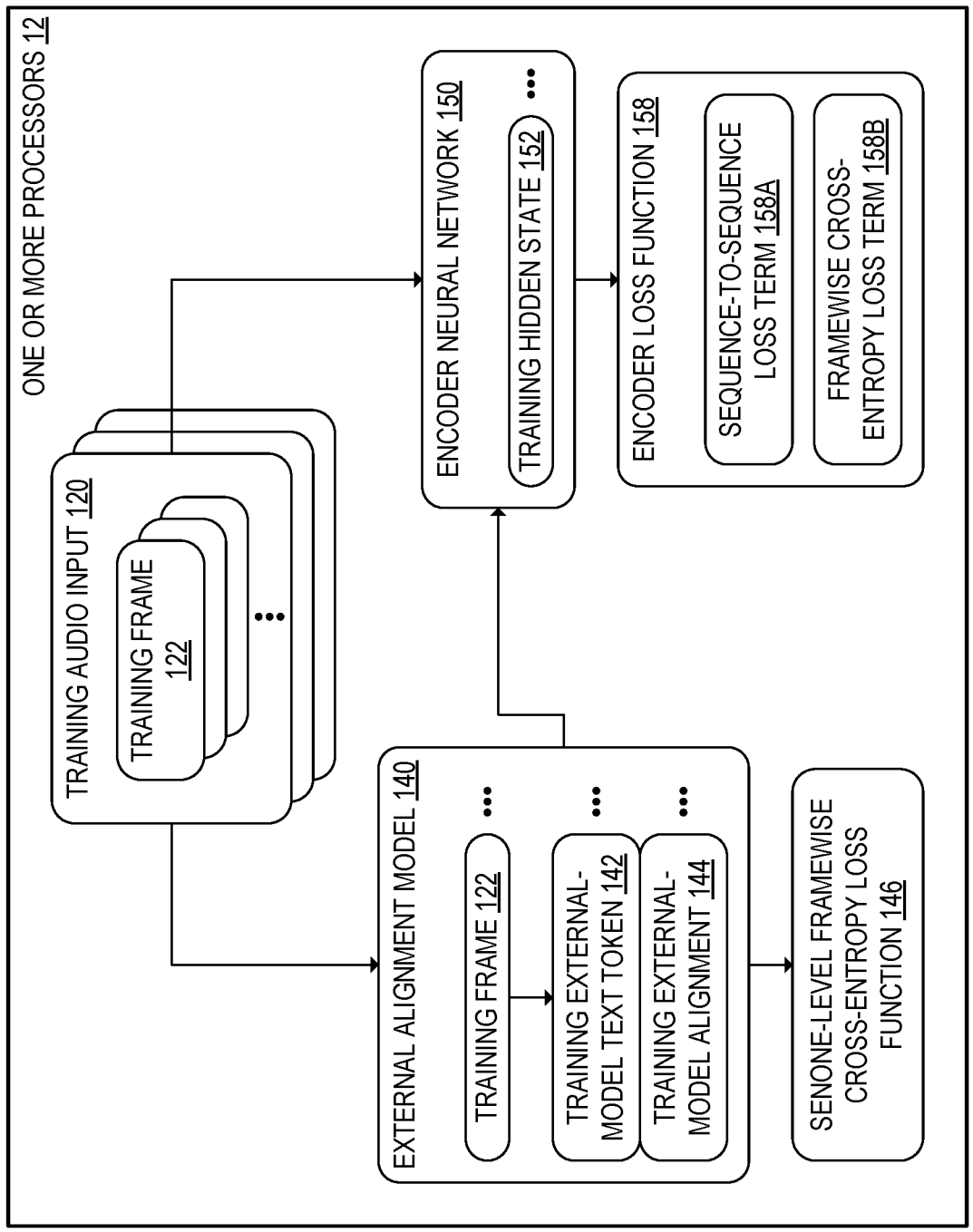
FIG. 3A schematically shows the one or more processors during training of an external alignment model and an encoder neural network, according to the embodiment of FIG. 1.

Turning now to FIG. 3A, the one or more processors 12 are shown according to one example embodiment when training the external alignment model 140 and the encoder neural network 150. In the example of FIG. 3A, the external alignment model 140 and the encoder neural network 150 are trained using a plurality of training audio inputs 120, each including a plurality of training frames 122. For each training audio input 120, the one or more processors 12 may be configured to generate, at the external alignment model 140, a plurality of training external-model text tokens 142 with a respective plurality of training external-model alignments 144. The external alignment model 140 may be trained using a senone-level framewise cross-entropy loss function 146. In some embodiments, the same training audio inputs 120 may be used to train both the external alignment model 140 and the encoder neural network 150.

In the example of FIG. 3A, when the encoder neural network 150 is trained, the one or more processors 12 may be further configured to generate a plurality of training hidden states 152 for each of the training audio inputs 120. The encoder neural network 150 may be trained at least in part with an encoder loss function 158 including a sequence-to-sequence loss term 158A and a framewise cross-entropy loss term 158B. In one example embodiment, the following encoder loss function 158 may be used:

$$L_{total} = (1-\lambda_{CE})L_{S2S}(y|x) + \lambda_{CE}L_{CE}(A|x)$$

In the above equation, $\lambda_{CE}$ is a tunable hyperparameter which may have a value between 0 and 1. x may be the input sequence of the encoder neural network 150 represented as a vector $x=(x_1, \ldots, x_T)$. y may be a plurality of ground-truth output text tokens represented as a vector $y=(y_1, \ldots, y_L)$, where L is the total number of training output text tokens associated with a training audio input 120, as discussed in further detail below. In addition, $A=(\alpha_1, \ldots, \alpha_T)$ may be a plurality of word-level alignments received from the external alignment model 140, where each $\alpha_j$ is a K-dimensional one-hot vector. In this example, K is the vocabulary size of the external alignment model 140. The framewise cross-entropy loss term 158B may be given by the following equation:

$$L_{CE}(A|x) = -\sum_{j=1}^{T} a_j \log q_j^{CE}$$

In this equation, T is the total number of input tokens and $q_j^{CE}$ is the jth posterior probability distribution for the framewise cross-entropy loss term 158B.

Figure 3B:
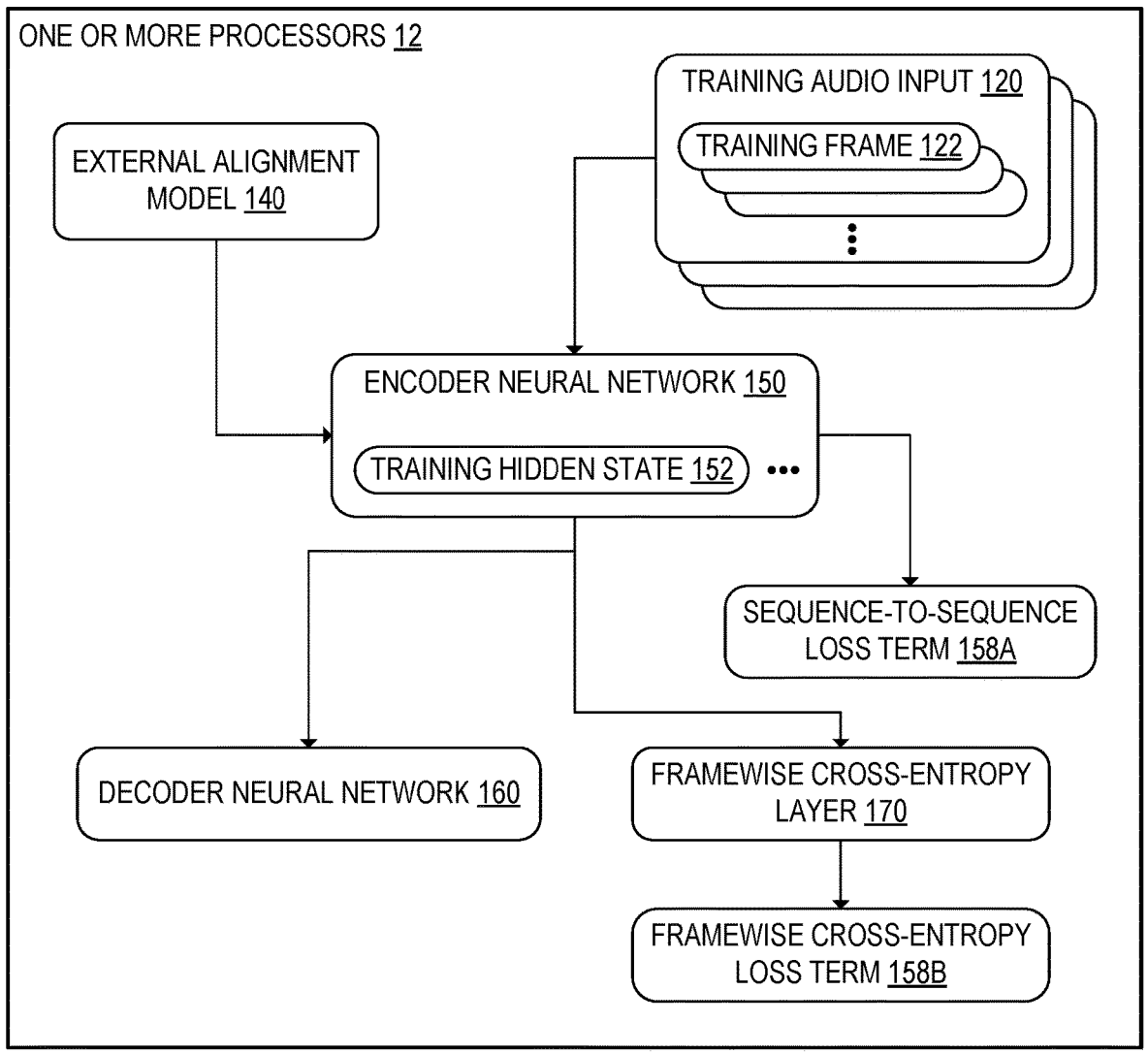
FIG. 3B schematically shows the one or more processors during training of the encoder neural network when multi-task training is used, according to the embodiment of FIG. 1.

The above equation for the encoder loss function 158 may be used in embodiments in which the encoder neural network 150 is trained concurrently with the decoder neural network 160, as discussed in further detail below with reference to FIG. 3B. In other embodiments, the encoder neural network 150 may be pre-trained with some other loss function that does not depend upon outputs of the decoder neural network 160, and the decoder neural network 160 may be subsequently trained with the training hidden states 152 output by the pre-trained encoder neural network 150.

In some embodiments, the encoder neural network 150 may be trained with the sequence-to-sequence loss term 158A and the framewise cross-entropy loss term 158B concurrently via multi-task learning. In such embodiments, $0<\lambda_{cE}<1$ in the above equation for the encoder loss function 158. When the encoder neural network 150 is trained via multi-task learning, the encoder neural network 150 neural network may be trained concurrently with the decoder neural network 160, as shown in FIG. 3B. In the example of FIG. 3B, the plurality of training hidden states 152 generated at the encoder neural network 150 are output to both the decoder neural network 160 and a framewise cross-entropy layer 170. The one or more processors 12 may be configured to compute the sequence-to-sequence loss term 158A using the training hidden states 152 output by the encoder neural network 150 and compute the framewise cross-entropy loss term 158B from the outputs of the framewise cross-entropy layer 170.

Figure 3C:
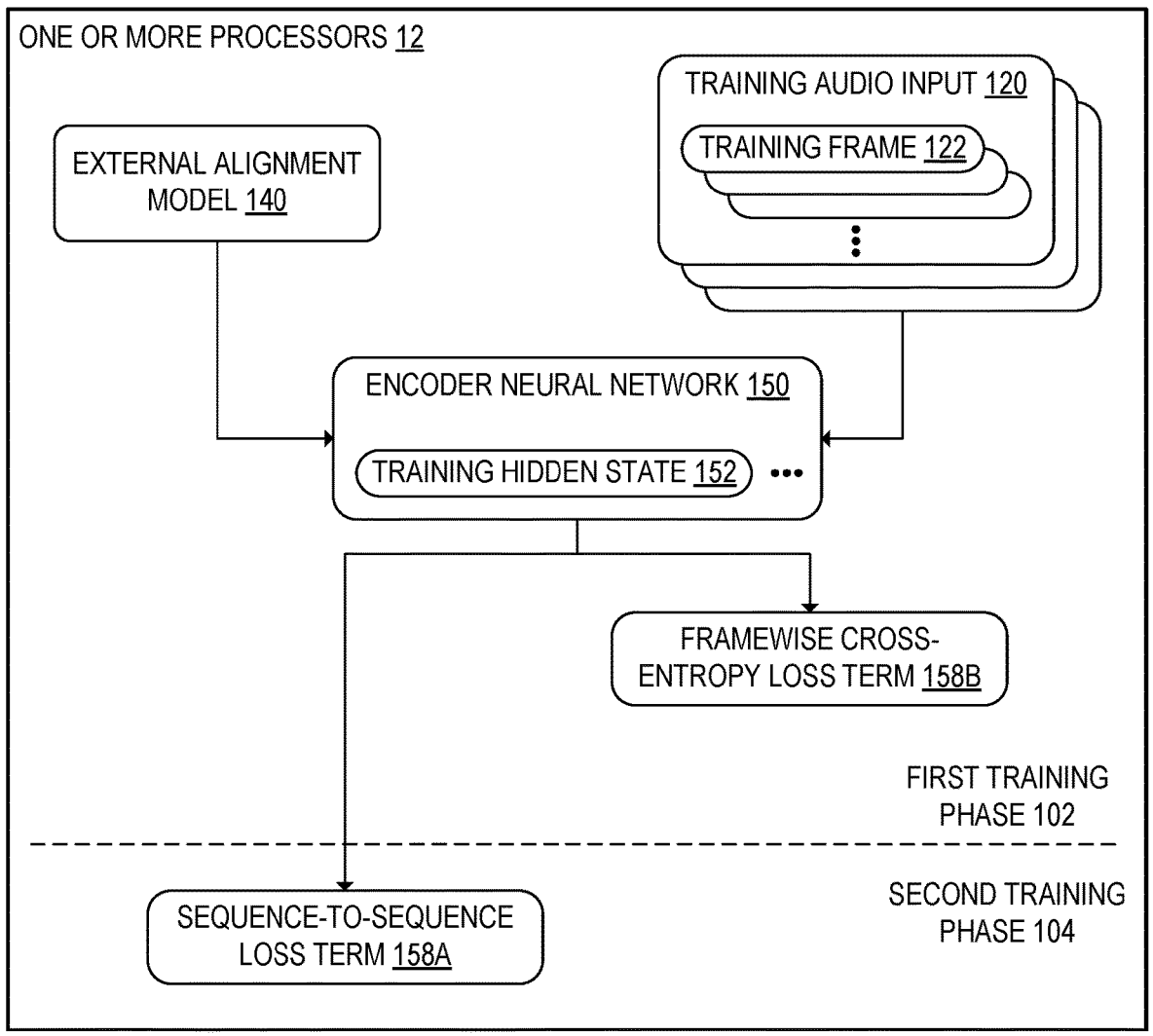
FIG. 3C schematically shows the one or more processors during training of the encoder neural network when the encoder neural network is pre-trained with a framewise cross-entropy loss term, according to the embodiment of FIG. 1.

In other embodiments, the encoder neural network 150 may be pre-trained with the framewise cross-entropy loss term 158B prior to training with the sequence-to-sequence loss term 158A. In such embodiments, as shown in FIG. 3C, the encoder neural network 150 may be trained with the framewise cross-entropy loss term 158B during a first training phase 102 and trained with the sequence-to-sequence loss term 158A during a second training phase 104. When the example encoder loss function 158 shown above is used, the tunable hyperparameter $\lambda_{CE}$ may be set to 1 during the first training phase 102 and set to 0 during the second training phase 104.

Returning to FIG. 1, the decoder neural network 60 may be configured to receive the plurality of hidden states 52 from the encoder neural network 50. Similarly to the encoder neural network 50, the decoder neural network 60 may be an RNN, such as an LSTM or a GRU. In some embodiments, the decoder neural network 60 may be a monotonic chunkwise attention model. When the decoder neural network 60 is a monotonic chunkwise attention model, the one or more processors 12 may be further configured to stochastically determine a binary attention state 56 for each hidden state 52 that indicates whether an output text token 62 corresponding to that hidden state 52 is generated.

FIG. 4A shows a grid 200 of selection probabilities $p_{i,j}$ for pairs of decoder outputs $y_i$ and hidden states $h_j$. The selection probabilities $p_{i,j}$ may be computed using the following equations:

$$e_{i,j}^{mono} = g \frac{v^T}{\|v\|} ReLU(W_h h_j + W_s s_i + b) + r$$

$$pi, j = \sigma(e_{i,j}^{mono})$$

In these equations, $e_{i,j}^{mono}$ is a monotonic energy activation, $h_j$ is the jth hidden state 52 output by the encoder neural network 50, $s_i$ is the ith state of the decoder neural network 60, $\sigma$ is a logistic sigmoid function, ReLU is the rectified linear unit function, and g, v, $W_h$, $W_s$, b, and r are learnable parameters of the decoder neural network 60.

The grid 200 shown in FIG. 4A includes a plurality of chunks 202 that each include the respective selection probabilities $p_{i,j}$ for a plurality of consecutive hidden states $h_j$ and a decoder output $y_i$. Each chunk 202 of the plurality of chunks 202 may include a number of selection probabilities $p_{i,j}$ equal to a predetermined chunk size w. In the example of FIG. 4A, the predetermined chunk size w is 4. In other embodiments, some other predetermined chunk size w such as 3 or 5 may be used. Chunks 202 including the first or last element of the vector of hidden states h may be smaller than the predetermined chunk size w used for other chunks 202.

For each chunk 202, the one or more processors 12 may be configured to sample a Bernoulli random variable $z_{i,j}$ from a probability distribution of the selection probabilities $p_{i,j}$ included in that chunk 202. In the example grid 200 of FIG. 4A, darker colors correspond to higher selection probabilities $p_{i,j}$. When the Bernoulli random variable $z_{i,j}$ has a value of 1 for a selection probability $p_{i,j}$, the one or more processors 12 may be further configured to "attend" to the hidden state $h_j$ associated with that selection probability $p_{i,j}$ by outputting an association between the hidden state $h_j$ and the encoder output $y_i$. When the Bernoulli random variable $z_{i,j}$ has a value of 0 for a selection probability $p_{i,j}$, the one or more processors 12 may instead select some other hidden state $h_j$ to associate with the value of the encoder output $y_i$.

The one or more processors 12 may be further configured to determine a respective output alignment 64 for each selection probability $p_{i,j}$ included in each chunk 202. The output alignment $\alpha_{i,j}$ corresponding to a selection probability $p_{i,j}$ is given by the following equation:

$$\alpha_{i,j} = p_{i,j} \sum_{k=1}^{j} \left( \alpha_{i-1,k} \prod_{l=k}^{j-1} (1 - p_{i,l}) \right) = p_{i,j} \left( (1 - p_{i,j-1}) \frac{\alpha_{i,j-1}}{p_{i,j-1}} + \alpha_{i-1,j} \right)$$

The plurality of output alignments $\alpha_{i,j}$ may indicate locations in the audio input 20 of expected boundaries between the output text tokens 62. Thus, the monotonic energy activations $e_{i,j}^{mono}$ may be used to determine the selection probabilities $p_{i,j}$, as discussed above, which may be used to determine the output alignments $\alpha_{i,j}$.

The one or more processors 12 may be further configured to determine a chunkwise energy activation $e_{i,j}^{chunk}$ for each chunk 202. For example the one or more processors 12 may use the following example equation for $e_{i,j}^{chunk}$:

$$e_{i,j}^{chunk} = V^* ReLU(W^* s_{chunk} + U^* h_{chunk})$$

In the above equation, $e_{i,j}^{chunk}$ is a scalar array with a size equal to the chunk size w. It will be appreciated that $h_{chunk}$ is a sequence of the respective hidden states 52 for the selection probabilities $p_{i,j}$ included in the chunk 202, and $s_{chunk}$ is a sequence of respective decoder states for those selection probabilities $p_{i,j}$. Further, U, V, and W are affine change-of-dimension layers and may be trained when training the decoder neural network 160.

The one or more processors 12 may be further configured to normalize the chunkwise energy activation $e_{i,j}^{chunk}$ using the following equation for an induced probability distribution $\{\beta_{i,j}\}$:

$$\beta_{i,j} = \sum_{k=j}^{j+w-1} \left( \alpha_{i,k} \exp(e_{i,j}^{chunk}) \Big/ \sum_{l=k-w+1}^{k} \exp(e_{i,l}^{chunk}) \right)$$

In this equation, w is the predetermined chunk size discussed above. The induced probability distribution $\{\beta_{i,j}\}$ may be a probability distribution of output text tokens 62 that may be output by the decoder neural network 50.

The one or more processors 12 may be further configured to determine a plurality of weighted encoder memory values $c_i$ weighted using the induced probability distribution $\{\beta_{i,j}\}$, as shown in the following equation:

$$c_i = \sum_{j=1}^{T} \beta_{i,j} h_j$$

Thus, rather than merely setting the weighted encoder memory values $c_i$ to be equal to the corresponding hidden values $h_j$, the one or more processors 12 may be configured to compute a respective softmax of the selection probabilities $p_{i,j}$ included in each chunk 202. The weighted encoded memory values $c_i$ may be included in a context vector which the decoder neural network 60 may use as an input.

In some embodiments, as shown in FIG. 1, the plurality of hidden states 52 generated by the encoder neural network 50 may be passed through a one-dimensional convolutional layer 54 prior to generating the binary attention states 56. The one-dimensional convolutional layer 54 may be represented as $W_c \in \mathbb{R}^{k \times k \times d}$ where k is a kernel size (e.g. 3, 4, or 5) and d is a channel size for the one-dimensional convolutional layer 54. The channel size d may be equal to the dimension of the hidden states $h_j$. The one or more processors 12 may be further configured to transform the hidden states $h_j$ into an attention space using the following transformation:

$$h'_{i,j} = W_h(W_c * h_j)$$

In this equation, $h'_{i,j}$ is a transformed hidden state.

Figure 4B:
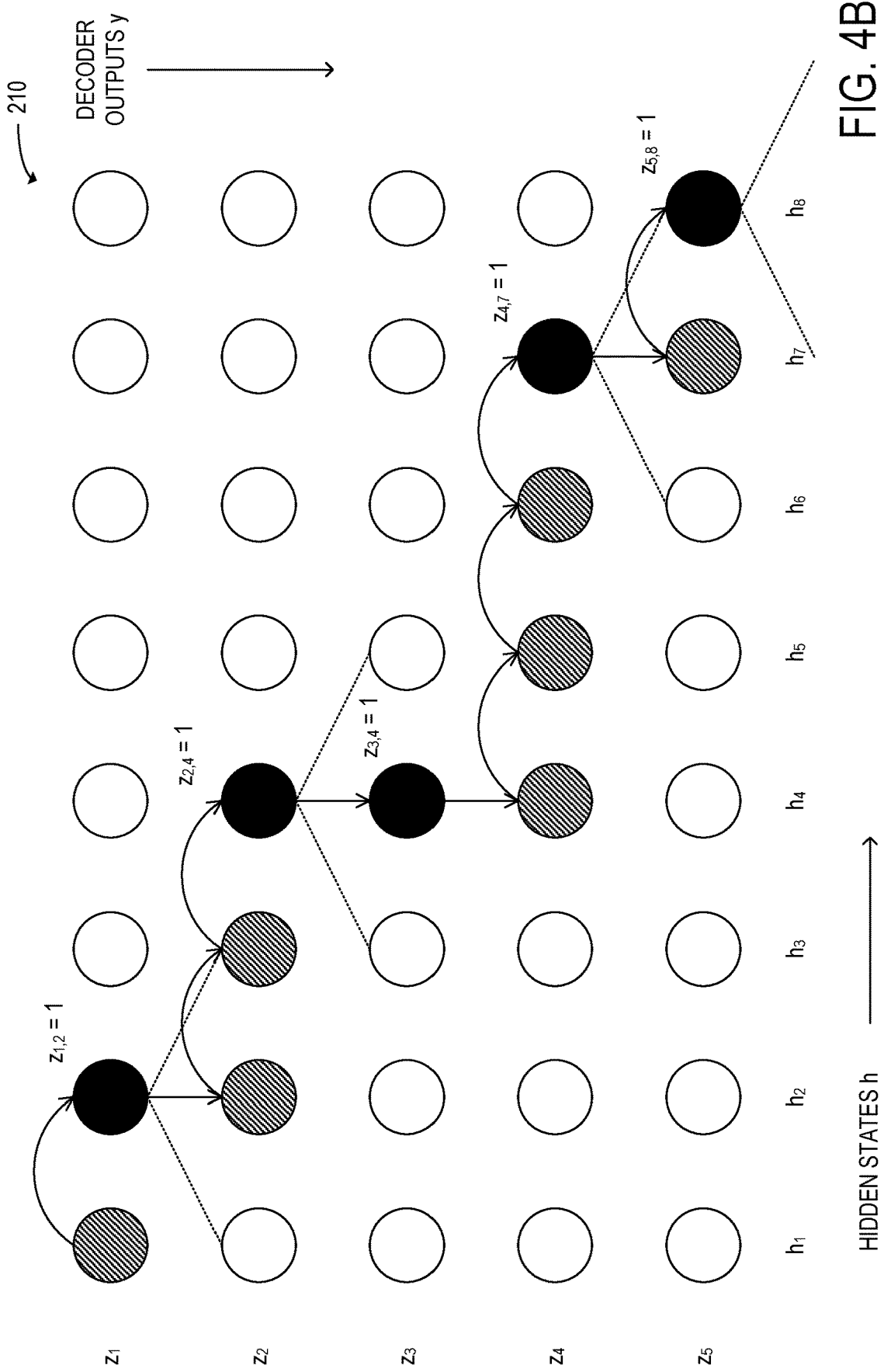
FIG. 4B shows the selection probabilities of FIG. 4A in an embodiment in which the decoder neural network includes a one-dimensional convolutional layer.

FIG. 4B shows another example grid 210 of selection probabilities $p_{i,j}$ in an embodiment where a one-dimensional convolutional layer 54 is included in the decoder neural network 60. In the embodiment of FIG. 4B, the one or more processors 12 are further configured to "look" back one value of j and "look" ahead one value of j from each of the selection probabilities $p_{i,j}$ for which $z_{i,j}=1$. Thus, the boundary prediction made by the decoder neural network 60 may be made more accurate by incorporating information from one or more frames 22 before or after a selected frame 22.

Figure 5A:
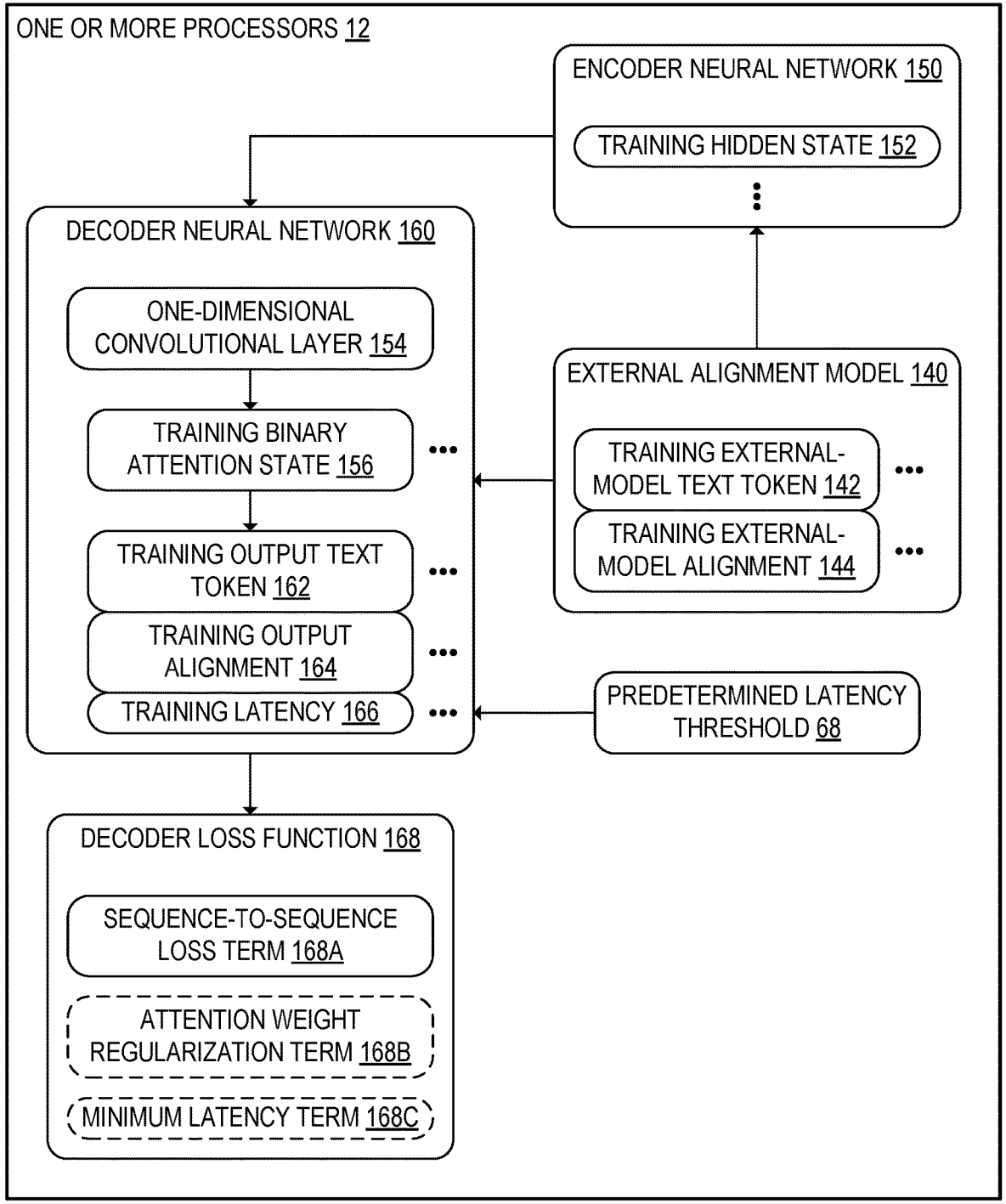
FIG. 5A schematically shows the one or more processors during training of the decoder neural network, according to the embodiment of FIG. 1.

FIG. 5A shows the one or more processors 12 when training the decoder neural network 160, according to one example embodiment. In the example of FIG. 4A, the decoder neural network 150 may use the training hidden states 152 of the encoder neural network 150 as training data. In some embodiments, the decoder neural network 160 may be configured to receive the training hidden states 152 as a context vector $\{c_i\}$ of weighted encoder memory values.

When the decoder neural network 160 is trained, the decoder neural network 160 may be configured to generate a plurality of training binary attention states 156 corresponding to the plurality of training hidden states 152. In some embodiments, as shown in the example of FIG. 5A, the decoder neural network 160 may further include a one-dimensional convolutional layer 154. The plurality of training hidden states 152 may be input into the one-dimensional convolutional layer 154 prior to generating the training binary attention states 156. The one-dimensional convolutional layer 154 may be trained concurrently with other layers of the decoder neural network 160.

From the plurality of training binary attention states 156, the decoder neural network 160 may be further configured to generate a respective plurality of training output text tokens 162 having a respective plurality of training output alignments 164. The decoder neural network 160 may be configured to generate the plurality of training output text tokens 162 such that each training output text token 162 has a training latency 166 below the predetermined latency threshold 68. In one example embodiment, the following constraint may be applied to the training output alignments $\alpha_{i,j}$:

$$a_{i,j} = \begin{cases} p_{i,j}\left((1-p_{i,j-1})\frac{\alpha_{i,j-1}}{p_{i,j-1}} + \alpha_{i-1,j}\right), & (j \leq b_i + \delta) \\ 0, & (\text{otherwise}) \end{cases}$$

In the above equation, $b_i$ is the ith external model alignment 44 and $\delta$ is the predetermined latency threshold 68. Thus, the training latency 166 may be kept below the predetermined latency threshold 68 during training of the decoder neural network 60 as well as at runtime.

The decoder neural network 160 may be trained using a decoder loss function 168 including a sequence-to-sequence loss term 168A. In some embodiments, the decoder loss function 168 may be a delay constrained training loss function including the sequence-to-sequence loss term 168A and an attention weight regularization term 168B. For example, the decoder loss function 168 may be computed using the following equation:

$$L_{total} = L_{S2S} + \lambda_{QUA} \left| L - \sum_{i=1}^{L} \sum_{j=1}^{T} \alpha_{i,j} \right|$$

In the above equation, $L_{total}$ is the decoder loss function 168, $L_{S2S}$ is the sequence-to-sequence loss term 168A, $\lambda_{QUA}$ is a tunable hyperparameter, and L is the total number of training output text tokens 162. By including the attention weight regularization term 168B in the decoder loss function 168, exponential decay of $\{\alpha_{i,j}\}$ may be avoided, and the number of nonzero values of $\alpha_{i,j}$ may be matched to L.

As an alternative to the delay constrained loss function, the decoder loss function 168 may be a minimum latency training loss function including the sequence-to-sequence loss term 168A and a minimum latency loss term 168C. The minimum latency loss term 168C may be given by the following equation:

$$L_{total} = L_{S2S} + \lambda_{MinLT} \frac{1}{L} \sum_{i=1}^{L} \left| \sum_{j=1}^{T} j\alpha_{i,j} - b_i \right|$$

In the above equation, $\lambda_{MinLT}$ is a tunable hyperparameter. In addition, the sum over values of $j\alpha_{i,j}$ represents an expected boundary location of the ith training output text token 162. Minimum latency training may account for differences in the training latencies 166 of different training output text tokens 162 when computing the value of the decoder loss function 168.

Figure 5B:
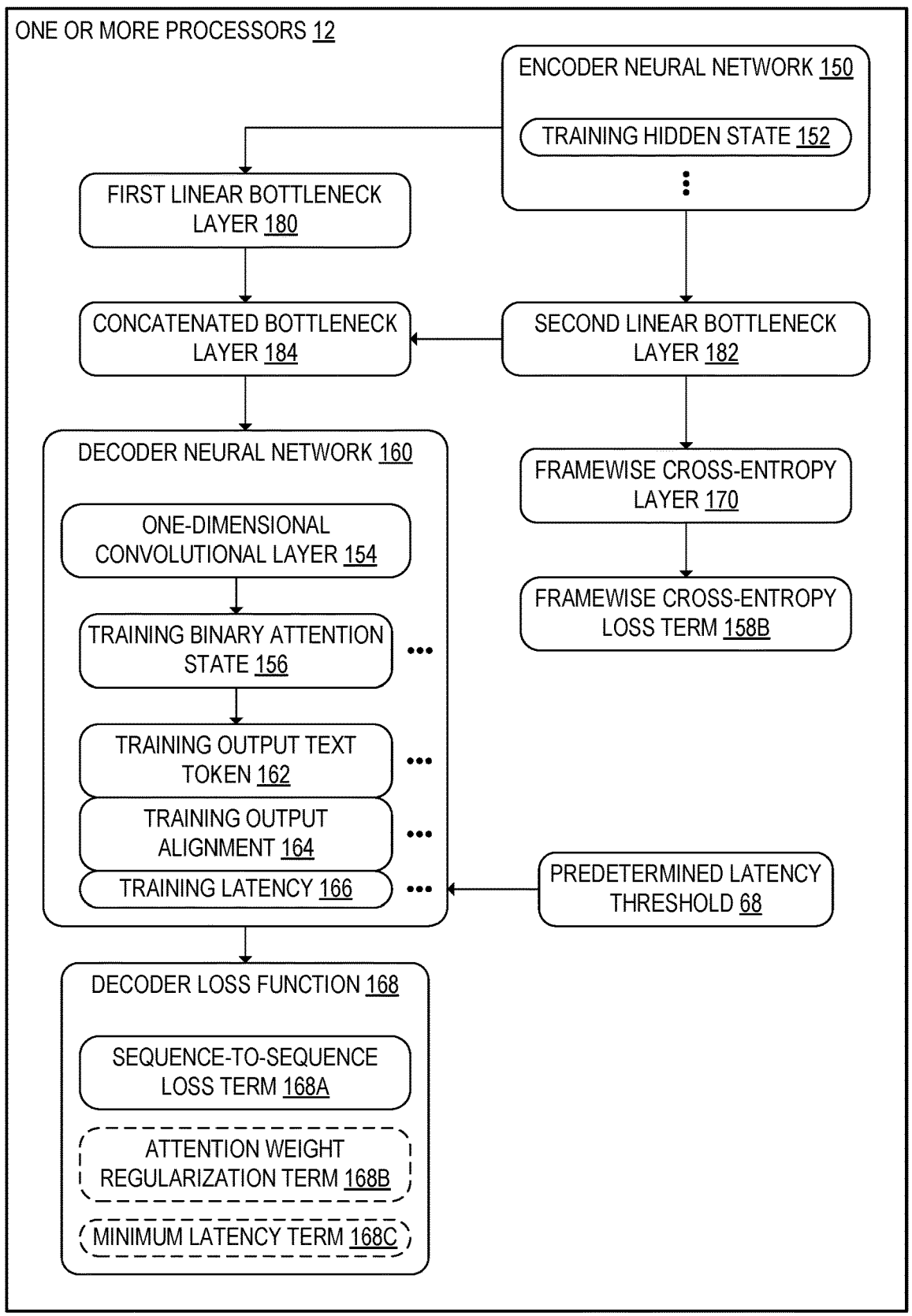
FIG. 5B schematically shows the one or more processors during concurrent training of the encoder neural network and the decoder neural network when the encoder neural network is trained in part at a first linear bottleneck layer and a second linear bottleneck layer, according to the embodiment of FIG. 1.

In some embodiments, as shown in FIG. 5B, the encoder neural network 150 and the decoder neural network 160 may be trained concurrently. In such embodiments, the encoder neural network 150 may be trained at least in part at a first linear bottleneck layer 180 and a second linear bottleneck layer 182. The first linear bottleneck layer 180 and the second linear bottleneck layer 182 may each be configured to receive the plurality of training hidden states 152 from the encoder neural network 150. In some embodiments, the first linear bottleneck layer 180 and the second linear bottleneck layer 182 may be configured to receive the plurality of training hidden states 152 as a context vector $\{c_i\}$ of weighted encoder memory values. The one or more processors 12 may be further configured to concatenate the outputs of the first linear bottleneck layer 180 and the second linear bottleneck layer 182 to form a concatenated bottleneck layer 184. The outputs of the concatenated bottleneck layer 184 may be used as training inputs at the decoder neural network 160. In addition, the outputs of the second linear bottleneck layer 182 may be received at a framewise cross-entropy layer 170. The one or more processors 12 may be further configured to compute a framewise cross-entropy loss term 158B based on the outputs of the framewise cross-entropy layer 170.

Figure 6A:
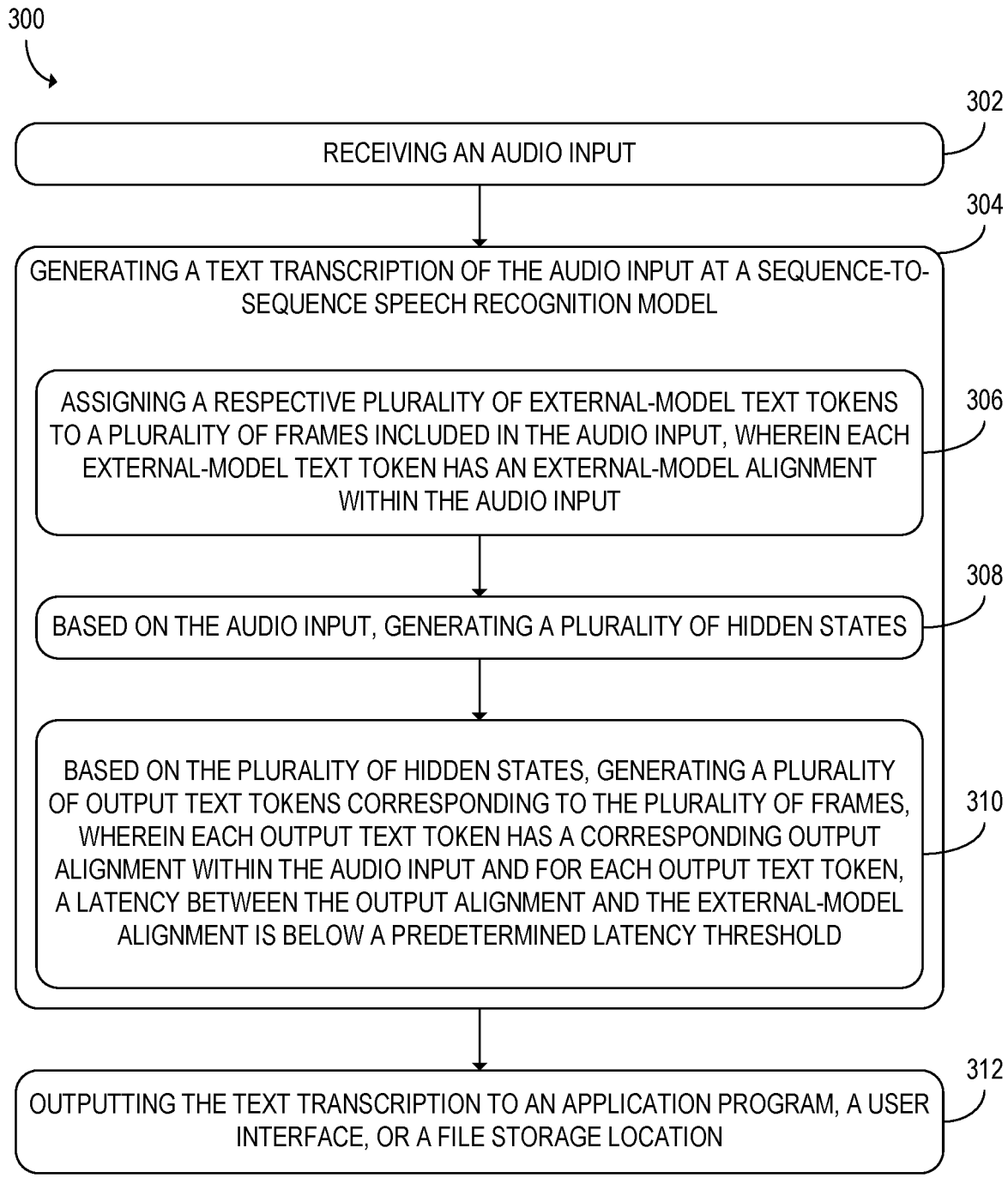
FIG. 6A shows a flowchart of a method that may be used at a computing system to generate a text transcription of an audio input, according to the embodiment of FIG. 1.

FIG. 6A shows a flowchart of a method 300 for use with a computing system, according to one example embodiment. The method 300 may be performed at the computing system 10 of FIG. 1 or at some other computing system. At step 302, the method 300 may include receiving an audio input. The audio input may be received at one or more processors via one or more microphones included in the computing system. The one or more processors and the one or more microphones may be provided in the same physical computing device or in separate physical computing devices that are communicatively coupled. In some embodiments, the audio input may be pre-processed, such as by dividing the audio input into a plurality of frames associated with respective time intervals.

At step 304, the method 300 may further include generating a text transcription of the audio input at a sequence-to-sequence speech recognition model. The sequence-to-sequence speech recognition model may include an external alignment model configured to generate the plurality of external-model text tokens, an encoder neural network configured to generate the plurality of hidden states, and a decoder neural network configured to generate the plurality of output text tokens. Each of the external alignment model, the encoder neural network, and the decoder neural network may be an RNN, such as an LSTM, a GRU, or some other type of RNN.

At step 306, step 304 may include assigning a respective plurality of external-model text tokens to a plurality of frames included in the audio input. These external-model text tokens may be assigned by the external alignment model. Each external-model text token assigned to a frame may have an external-model alignment within the audio input that indicates the frame to which the external-model text token is assigned. The external alignment model may be an acoustic model configured to identify senone-level features in the audio input and assign the external-model text tokens to the senone-level features.

At step 308, step 304 may further include generating a plurality of hidden states based on the audio input. The hidden states may be generated at the encoder neural network and may be word-level or sub-word-level latent representations of features included in the audio input.

At step 310, step 304 may further include generating a plurality of output text tokens corresponding to the plurality of frames at a decoder neural network. The plurality of output text tokens may be generated at the decoder neural network based on the plurality of hidden states. Each output text token may have a corresponding output alignment within the audio input that indicates a frame with which the output text token is associated. In addition, the decoder neural network may be configured to generate the plurality of output text tokens such that for each output text token, a latency between the output alignment and the external-model alignment is below a predetermined latency threshold. This latency constraint may be enforced, for example, by generating a plurality of output alignments and discarding any output alignment with a latency higher than the predetermined latency threshold relative to the external-model alignment.

At step 312, the method 300 may further include outputting the text transcription including the plurality of output text tokens to an application program, a user interface, or a file storage location. In some embodiments, the audio input may be a streaming audio input received over an input time interval. In such embodiments, the text transcription may be output during the input time interval concurrently with receiving the audio input. Thus, the text transcription may be generated and output in real time as the audio input is in the process of being received.

Figure 6B:
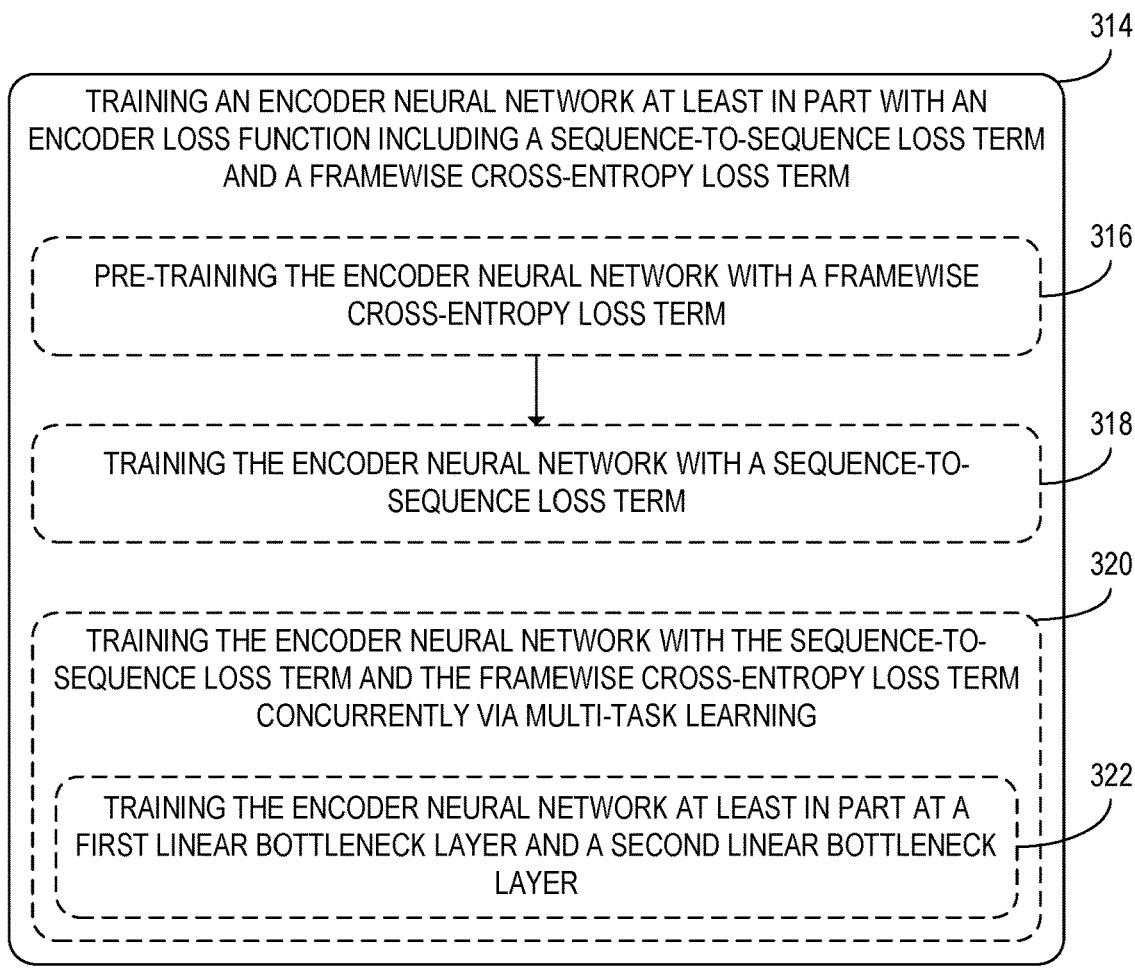
FIG. 6B shows additional steps of the method of FIG. 6A that may be performed when training an encoder neural network.

FIG. 6B shows additional steps of the method 300 that may be performed in some embodiments to train the encoder neural network. The steps shown in FIG. 6B may be performed prior to receiving the audio input at step 302 of FIG. 6A. At step 314, the method 300 may further include training the encoder neural network at least in part with an encoder loss function including a sequence-to-sequence loss term and a framewise cross-entropy loss term. In some embodiments, step 314 may further include, at step 316, pre-training the encoder neural network with the framewise cross-entropy loss term during a first training phase. In embodiments in which the encoder neural network is pre-trained with the framewise cross-entropy loss term, the framewise cross-entropy loss term may be computed from the outputs of a framewise cross-entropy layer configured to receive the plurality of training hidden states output by the encoder neural network. After the encoder neural network is pre-trained, step 314 may further include, at step 318, training the encoder neural network with the sequence-to-sequence loss term during a second training phase.

Alternatively, step 314 may include, at step 320, training the encoder neural network with the sequence-to-sequence loss term and the framewise cross-entropy loss term concurrently via multi-task learning. When the encoder neural network is trained via multi-task learning, the encoder neural network and the decoder neural network may be trained concurrently. Training the encoder neural network via multi-task learning may, in some embodiments, include training the encoder neural network at least in part at a first linear bottleneck layer and a second linear bottleneck layer, as shown in step 322. When a first linear bottleneck layer and a second linear bottleneck layer are used to train the encoder neural network, the outputs of the first linear bottleneck layer and the second linear bottleneck layer may be concatenated to form a concatenated bottleneck layer. The outputs of the concatenated bottleneck layer may be used as inputs to the decoder neural network. In addition, the outputs of the second linear bottleneck layer may be received at a framewise cross-entropy layer. A framewise cross-entropy loss term may be computed from the outputs of the framewise cross-entropy layer.

Figure 6C:
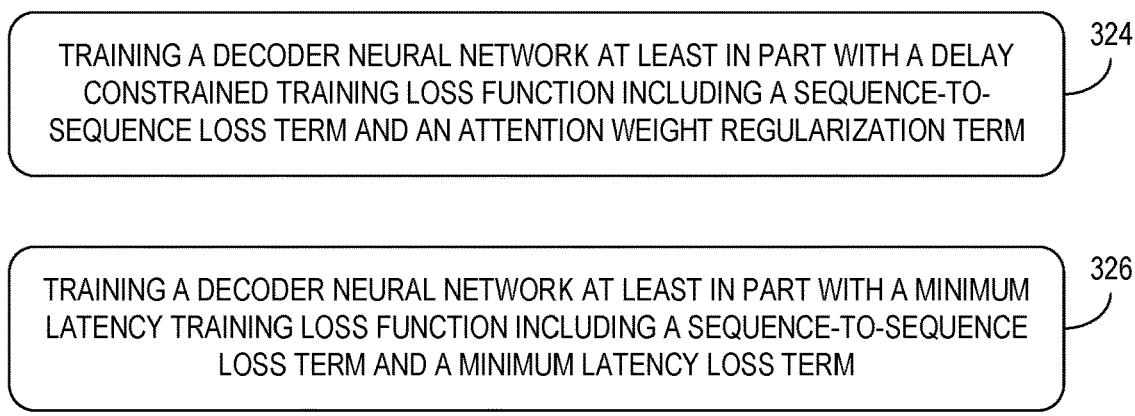
FIG. 6C shows additional steps of the method of FIG. 6A that may be performed when training a decoder neural network.

FIG. 6C shows additional steps of the method 300 that may be performed in some embodiments to train the decoder neural network. At step 324, the method 300 may further include training the decoder neural network at least in part with a delay constrained training loss function including a sequence-to-sequence loss term and an attention weight regularization term. Alternatively, at step 326, the method 300 may further include training the decoder neural network at least in part with a minimum latency training loss function including a sequence-to-sequence loss term and a minimum latency term. In some embodiments, the decoder neural network may be trained concurrently with the encoder neural network.

Using the systems and methods discussed above, the latency between inputs and outputs during ASR may be reduced in comparison to conventional ASR techniques such as CTC, RNN-T, and RNA. This reduction in latency may improve the experience of using ASR by reducing the amount of time the user has to wait while entering speech inputs. By reducing the amount of time for which the user of an ASR system has to wait for speech inputs to be processed into text, the systems and methods discussed above may allow the user to obtain text transcriptions of speech inputs more quickly and with fewer interruptions. The systems and methods discussed above may also have higher processing efficiency compared to existing S2S ASR methods. As a result of this increase in processing efficiency, network latency may also be reduced when the S2S speech recognition model is instantiated at least in part at one or more server computing devices that communicate with a client device. In addition, the systems and methods described above may result in a reduced word error rate in comparison to existing ASR techniques.

In some embodiments, the methods and processes described herein may be tied to a computing system of one or more computing devices. In particular, such methods and processes may be implemented as a computer-application program or service, an application-programming interface (API), a library, and/or other computer-program product.

Figure 7:
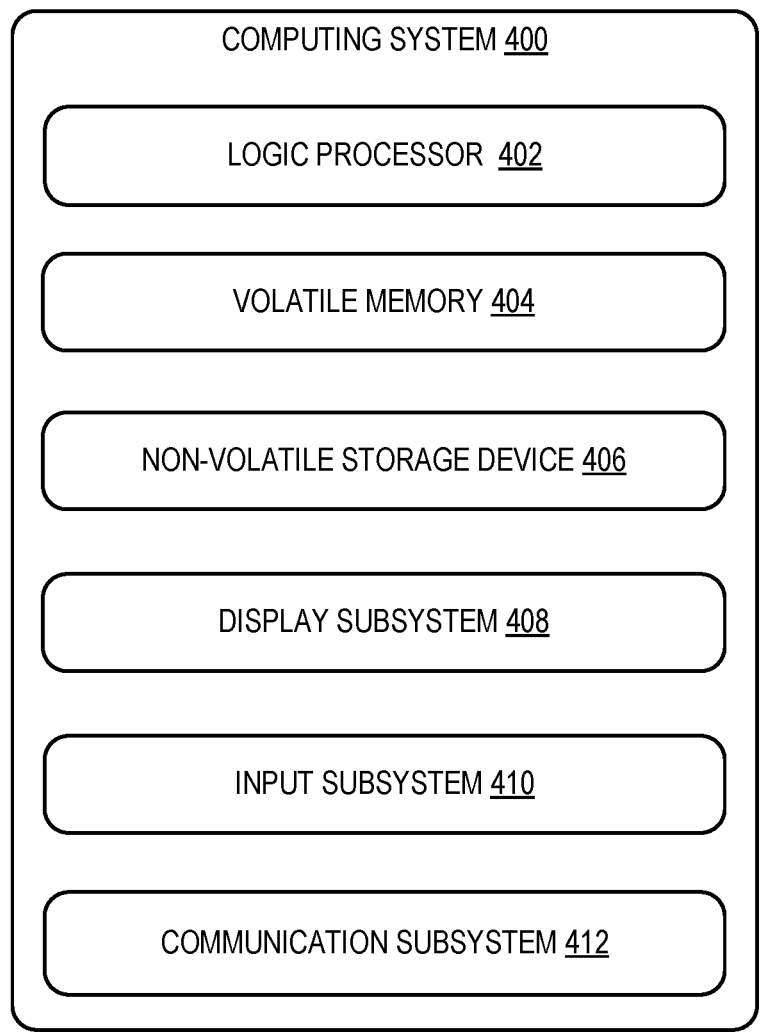
FIG. 7 shows a schematic view of an example computing environment in which the computer device of FIG. 1 may be enacted.

FIG. 7 schematically shows a non-limiting embodiment of a computing system 400 that can enact one or more of the methods and processes described above. Computing system 400 is shown in simplified form. Computing system 400 may embody the computing system 10 described above and illustrated in FIG. 1. Computing system 400 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 400 includes a logic processor 402 volatile memory 404, and a non-volatile storage device 406. Computing system 400 may optionally include a display subsystem 408, input subsystem 410, communication subsystem 412, and/or other components not shown in FIG. 7.

Logic processor 402 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 402 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 406 includes one or more physical devices configured to hold instructions executable by the logic processors to implement the methods and processes described herein. When such methods and processes are implemented, the state of non-volatile storage device 406 may be transformed—e.g., to hold different data.

Non-volatile storage device 406 may include physical devices that are removable and/or built-in. Non-volatile storage device 406 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 406 may include nonvolatile, dynamic, static, read/write, read-only, sequential-access, location-addressable, file-addressable, and/or content-addressable devices. It will be appreciated that non-volatile storage device 406 is configured to hold instructions even when power is cut to the non-volatile storage device 406.

Volatile memory 404 may include physical devices that include random access memory. Volatile memory 404 is typically utilized by logic processor 402 to temporarily store information during processing of software instructions. It will be appreciated that volatile memory 404 typically does not continue to store instructions when power is cut to the volatile memory 404.

Aspects of logic processor 402, volatile memory 404, and non-volatile storage device 406 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 400 typically implemented in software by a processor to perform a particular function using portions of volatile memory, which function involves transformative processing that specially configures the processor to perform the function. Thus, a module, program, or engine may be instantiated via logic processor 402 executing instructions held by non-volatile storage device 406, using portions of volatile memory 404. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 408 may be used to present a visual representation of data held by non-volatile storage device 406. The visual representation may take the form of a graphical user interface (GUI). As the herein described methods and processes change the data held by the non-volatile storage device, and thus transform the state of the non-volatile storage device, the state of display subsystem 408 may likewise be transformed to visually represent changes in the underlying data. Display subsystem 408 may include one or more display devices utilizing virtually any type of technology. Such display devices may be combined with logic processor 402, volatile memory 404, and/or non-volatile storage device 406 in a shared enclosure, or such display devices may be peripheral display devices.

When included, input subsystem 410 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 412 may be configured to communicatively couple various computing devices described herein with each other, and with other devices. Communication subsystem 412 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 400 to send and/or receive messages to and/or from other devices via a network such as the Internet.

According to one aspect of the present disclosure, a computing system is provided, including one or more processors configured to receive an audio input. The one or more processors may be further configured to generate a text transcription of the audio input at a sequence-to-sequence speech recognition model configured to at least assign a respective plurality of external-model text tokens to a plurality of frames included in the audio input. Each external-model text token may have an external-model alignment within the audio input. Based on the audio input, the sequence-to-sequence speech recognition model may be further configured to generate a plurality of hidden states. Based on the plurality of hidden states, the sequence-to-sequence speech recognition model may be further configured to generate a plurality of output text tokens corresponding to the plurality of frames. Each output text token may have a corresponding output alignment within the audio input. For each output text token, a latency between the output alignment and the external-model alignment may be below a predetermined latency threshold. The one or more processors may be further configured to output the text transcription including the plurality of output text tokens to an application program, a user interface, or a file storage location.

According to this aspect, the sequence-to-sequence speech recognition model may include an external alignment model configured to generate the plurality of external-model text tokens, an encoder neural network configured to generate the plurality of hidden states, and a decoder neural network configured to generate the plurality of output text tokens. The encoder neural network and the decoder neural network may be recurrent neural networks.

According to this aspect, the decoder neural network may be a monotonic chunkwise attention model.

According to this aspect, for each hidden state, the one or more processors are further configured to stochastically determine a binary attention state.

According to this aspect, the audio input may be a streaming audio input received by the one or more processors over an input time interval. The one or more processors may be configured to output the text transcription during the input time interval concurrently with receiving the audio input.

According to this aspect, the encoder neural network may be trained at least in part with an encoder loss function including a sequence-to-sequence loss term and a framewise cross-entropy loss term.

According to this aspect, the encoder neural network may be pre-trained with the framewise cross-entropy loss term prior to training with the sequence-to-sequence loss term.

According to this aspect, the encoder neural network may be trained with the sequence-to-sequence loss term and the framewise cross-entropy loss term concurrently via multi-task learning.

According to this aspect, the encoder neural network may be trained at least in part at a first linear bottleneck layer and a second linear bottleneck layer.

According to this aspect, the decoder neural network may be trained at least in part with a delay constrained training loss function including a sequence-to-sequence loss term and an attention weight regularization term.

According to this aspect, the decoder neural network may be trained at least in part with a minimum latency training loss function including a sequence-to-sequence loss term and a minimum latency loss term.

According to another aspect of the present disclosure, a method for use with a computing system is provided. The method may include receiving an audio input. The method may further include generating a text transcription of the audio input at a sequence-to-sequence speech recognition model. The text transcription may be generated at least by assigning a respective plurality of external-model text tokens to a plurality of frames included in the audio input. Each external-model text token may have an external-model alignment within the audio input. Based on the audio input, the text transcription may be further generated by generating a plurality of hidden states. Based on the plurality of hidden states, the text transcription may be further generated by generating a plurality of output text tokens corresponding to the plurality of frames. Each output text token may have a corresponding output alignment within the audio input. For each output text token, a latency between the output alignment and the external-model alignment may be below a predetermined latency threshold. The method may further include outputting the text transcription including the plurality of output text tokens to an application program, a user interface, or a file storage location.

According to this aspect, the sequence-to-sequence speech recognition model may include an external alignment model configured to generate the plurality of external-model text tokens, an encoder neural network configured to generate the plurality of hidden states, and a decoder neural network configured to generate the plurality of output text tokens. The encoder neural network and the decoder neural network may be recurrent neural networks.

According to this aspect, the audio input may be a streaming audio input received over an input time interval. The text transcription may be output during the input time interval concurrently with receiving the audio input.

According to this aspect, the method may further include training the encoder neural network at least in part with an encoder loss function including a sequence-to-sequence loss term and a framewise cross-entropy loss term.

According to this aspect, the method may further include pre-training the encoder neural network with the framewise cross-entropy loss term prior to training with the sequence-to-sequence loss term.

According to this aspect, the method may further include training the encoder neural network with the sequence-to-sequence loss term and the framewise cross-entropy loss term concurrently via multi-task learning.

According to this aspect, the method may further include training the decoder neural network at least in part with a delay constrained training loss function including a sequence-to-sequence loss term and an attention weight regularization term. The decoder neural network may be a monotonic chunkwise attention model.

According to this aspect, the method may further include training the decoder neural network at least in part with a minimum latency training loss function including a sequence-to-sequence loss term and a minimum latency loss term. The decoder neural network may be a monotonic chunkwise attention model.

According to another aspect of the present disclosure, a computing system is provided, including one or more processors configured to receive an audio input. The one or more processors may be further configured to generate a text transcription of the audio input at a sequence-to-sequence speech recognition model configured to at least, at an external alignment model, assign a respective plurality of external-model text tokens to a plurality of frames included in the audio input. Each external-model text token may have an external-model alignment within the audio input. The sequence-to-sequence speech recognition model may be further configured to, at one or more recurrent neural networks including at least a monotonic chunkwise attention model, generate a plurality of output text tokens corresponding to the plurality of frames. Each output text token may have a corresponding output alignment within the audio input. For each output text token, a latency between the output alignment and the external-model alignment may be below a predetermined latency threshold. The one or more processors may be further configured to output the text transcription including the plurality of output text tokens to an application program, a user interface, or a file storage location.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing system comprising:
one or more processors configured to:
receive an audio input;
generate a text transcription of the audio input at a sequence-to-sequence speech recognition model that includes a trained external alignment model, a trained encoder neural network, and a trained decoder neural network, the sequence-to-sequence speech recognition model being configured to at least:
assign, via the trained external alignment model, a respective plurality of external-model text tokens to a plurality of frames included in the audio input, wherein each external-model text token has an external-model alignment within the audio input;
based at least in part on the audio input, generate a plurality of hidden states via the trained encoder neural network; and
based at least in part on the plurality of hidden states and the respective external-model alignments of the external-model text tokens, generate a plurality of output text tokens corresponding to the plurality of frames via the trained decoder neural network, wherein:
each output text token has a corresponding output alignment within the audio input; and
for each output text token, a latency between the output alignment and the external-model alignment is below a predetermined latency threshold; and
output the text transcription including the plurality of output text tokens to an application program, a user interface, or a file storage location.

2. The computing system of claim 1, wherein the trained encoder neural network and the trained decoder neural network are recurrent neural networks.

3. The computing system of claim 2, wherein the trained decoder neural network is a monotonic chunkwise attention model.

4. The computing system of claim 3, wherein, for each hidden state, the one or more processors are further configured to stochastically determine a binary attention state.

5. The computing system of claim 1, wherein:
the audio input is a streaming audio input received by the one or more processors over an input time interval; and
the one or more processors are configured to output the text transcription during the input time interval concurrently with receiving the audio input.

6. The computing system of claim 1, wherein the trained encoder neural network is trained at least in part with an encoder loss function including a sequence-to-sequence loss term and a framewise cross-entropy loss term.

7. The computing system of claim 6, wherein the trained encoder neural network is pre-trained with the framewise cross-entropy loss term prior to training with the sequence-to-sequence loss term.

8. The computing system of claim 6, wherein the trained encoder neural network is trained with the sequence-to-sequence loss term and the framewise cross-entropy loss term concurrently via multi-task learning.

9. The computing system of claim 8, wherein the trained encoder neural network is trained at least in part at a first linear bottleneck layer and a second linear bottleneck layer.

10. The computing system of claim 1, wherein the trained decoder neural network is trained at least in part with a delay constrained training loss function including a sequence-to-sequence loss term and an attention weight regularization term, wherein the attention weight regularization term is a function of a plurality of training output alignments.

11. The computing system of claim 1, wherein the trained decoder neural network is trained at least in part with a minimum latency training loss function including a sequence-to-sequence loss term and a minimum latency loss term, wherein the minimum latency loss term is a function of a plurality of training output alignments and a corresponding plurality of training external-model alignments the latency between the output alignment and the external model alignment.

12. A method for use with a computing system, the method comprising:
receiving an audio input;
generating a text transcription of the audio input at a sequence-to-sequence speech recognition model that includes a trained external alignment model, a trained encoder neural network, and a trained decoder neural network, wherein the text transcription is generated at least by:
assigning, via the trained external alignment model, a respective plurality of external-model text tokens to a plurality of frames included in the audio input, wherein each external-model text token has an external-model alignment within the audio input;
based at least in part on the audio input, generating a plurality of hidden states via the trained encoder neural network; and
based at least in part on the plurality of hidden states and the respective external-model alignments of the external-model text tokens, generating a plurality of output text tokens corresponding to the plurality of frames via the trained decoder neural network, wherein:
each output text token has a corresponding output alignment within the audio input; and
for each output text token, a latency between the output alignment and the external-model alignment is below a predetermined latency threshold; and
outputting the text transcription including the plurality of output text tokens to an application program, a user interface, or a file storage location.

13. The method of claim 12, wherein the trained encoder neural network and the trained decoder neural network are recurrent neural networks.

14. The method of claim 12, wherein:
the audio input is a streaming audio input received over an input time interval; and
the text transcription is output during the input time interval concurrently with receiving the audio input.

15. The method of claim 12, further comprising training the trained encoder neural network at least in part with an encoder loss function including a sequence-to-sequence loss term and a framewise cross-entropy loss term.

16. The method of claim 15, further comprising pre-training the trained encoder neural network with the framewise cross-entropy loss term prior to training with the sequence-to-sequence loss term.

17. The method of claim 15, further comprising training the trained encoder neural network with the sequence-to-sequence loss term and the framewise cross-entropy loss term concurrently via multi-task learning.

18. The method of claim 12, further comprising training the trained decoder neural network at least in part with a delay constrained training loss function including a sequence-to-sequence loss term and an attention weight regularization term, wherein the decoder neural network is a monotonic chunkwise attention model and the attention weight regularization term is a function of a plurality of training output alignments.

19. The method of claim 12, further comprising training the trained decoder neural network at least in part with a minimum latency training loss function including a sequence-to-sequence loss term and a minimum latency loss term, wherein:
the minimum latency loss term is a function of a plurality of training output alignments and a corresponding plurality of training external-model alignments; and
the decoder neural network is a monotonic chunkwise attention model.

20. A computing system comprising:
one or more processors configured to:
receive an audio input;
generate a text transcription of the audio input at a sequence-to-sequence speech recognition model that includes a trained external alignment model, a trained encoder neural network, and one or more trained decoder neural networks, the sequence-to-sequence speech recognition model being configured to at least:
at the trained external alignment model, assign a respective plurality of external-model text tokens to a plurality of frames included in the audio input, wherein each external-model text token has an external-model alignment within the audio input;
at the one or more trained decoder neural networks, generate a plurality of output text tokens corresponding to the plurality of frames based at least in part on the respective external-model alignments of the external-model text tokens, wherein:
the one or more trained decoder neural networks are one or more recurrent neural networks including at least a monotonic chunkwise attention model;
each output text token has a corresponding output alignment within the audio input; and
for each output text token, a latency between the output alignment and the external-model alignment is below a predetermined latency threshold; and
output the text transcription including the plurality of output text tokens to an application program, a user interface, or a file storage location, wherein the text transcription is generated in real time as a user is speaking.

\* \* \* \* \*